United States Patent Office 3,031,454
Patented Apr. 24, 1962

3,031,454
HEXAHYDRO QUINOLIZINES
Charles H. Tilford, Cincinnati, Ohio, assignor to Richardson-Merrell Inc., a corporation of Delaware
No Drawing. Filed Mar. 24, 1959, Ser. No. 801,432
4 Claims. (Cl. 260—293)

This invention relates to new quinolizines having useful therapeutic properties.

The new compounds of the present invention have adrenergic blocking action; and because of this physiological activity, they are useful hypotensive agents in the treatment of hypertension, shock and peripheral vascular diseases. They are also useful in the diagnosis and treatment of pheochromocytoma. For the treatment of these conditions, the compounds may be administered orally or parenterally in dosages ranging from 25 milligrams to 3000 milligrams depending upon the condition treated, the route of administration, the pharmaceutical formulation in which they are administered, the age and condition of the patient and in accordance with the advice of the attending physician.

The compounds of the present invention also have antiinflammatory properties and are useful in the treatment of inflammations of the skin and mucous membranes and the treatment of collagen diseases. For treatment of skin inflammations, the compounds may be applied topically in lotions, salves, creams or the like. For other inflammatory conditions, they may be administered orally or parenterally in dosages ranging from about 2 to 30 milligrams per kilogram of body weight.

The new compounds may be represented by the following general formula:

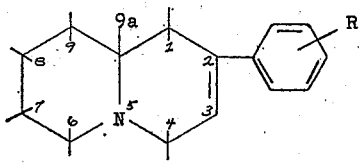

in which R is a member of the group consisting of hydrogen, lower alkyl, hydroxy, lower alkoxy, halogen and dialkylaminoalkoxy.

The new compounds may be prepared and used as the free base as shown above or in the form of one of its salts with various pharmaceutically acceptable acids such as hydrochloric, citric, maleic, tartaric or other acids or in the form of quaternary and N-oxide salts.

The new compounds can be readily prepared from 3-methyl-3-phenyl (or substituted phenyl) octahydropyrid-[1,2-c]-oxazine by acidic hydrolysis followed by dehydration. The oxazine can be prepared by reaction of the desired α-methyl-α-phenyl-2-piperidine ethanol with formaldehyde. The reactions including the synthesis of the piperidine ethanol may be illustrated by the following series of equations:

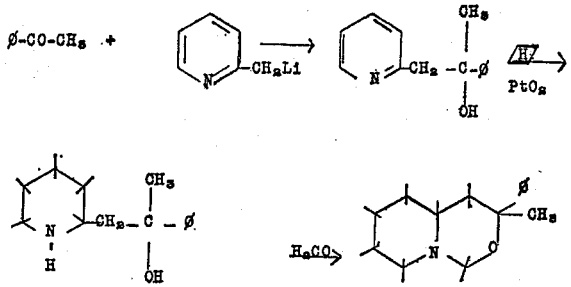

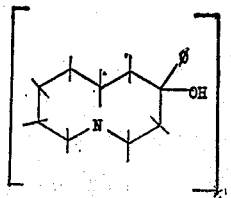

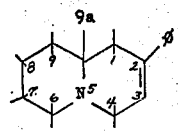

In the above equations, φ represents a phenyl radical or a phenyl radical having substituents as indicated above. Any strong mineral acid such as hydrochloric, hydrobromic or sulfuric may be used in rearranging and dehydrating the pyridoxazine to the hexahydro quinolizine. Temperatures ranging from about 90° C. to about 150° C. may be used, and the heating period may run from six to twenty-four hours. The preparation of representative new compounds of the present invention will be illustrated by the following examples.

*Example 1*

To a stirred suspension of picolyl lithium [from 11 grams (1.6 mol) lithium, 126 grams (0.8 mol) bromobenzene and 80 milliliters (0.8 mol) alpha-picoline] in 400 milliliters dry ether, was added, over a period of thirty minutes and at a temperature of from —10° to —20° C., 85 milliliters (0.7 mol) of acetophenone. The resulting mixture was heated under reflux for two hours, then decomposed with an aqueous ammonium chloride solution. After separation of the ether layer, the ether was removed under vacuum, and the residue was subjected to distillation to a temperature of 140° C. at 0.5 mm. pressure. A portion of the residue (123 grams, 83 percent yield) was recrystallized from petroleum ether (boiling point 75–90° C.) to give the base, alpha-methyl-alpha-phenyl-2-pyridineethanol, melting point 50–52° C. Conversion of the remainder of the base to the hydrochloride salt gave 65 grams of alpha-methyl-alpha-phenyl-2-pyridineethanol hydrochloride (from ethyl acetate-isopropanol) melting at 140–142° C.

Sixty-five grams (0.26 mol) of alpha-methyl-alpha-phenyl-2-pyridineethanol hydrochloride in 270 milliliters of 95 percent methanol, containing 1.2 grams platinum oxide catalyst, was subjected to hydrogenation. The theoretical amount of hydrogen, a pressure drop of 65 pounds (based on the standard 0.1 mol=8.5 pound drop) was absorbed in four hours. After filtration of the mixture, the filtrate was concentrated under vacuum to an oil. The oil, crude alpha-methyl-alpha-phenyl-2-piperidineethanol hydrochloride, was dissolved in 200 milliliters of methanol, the solution treated with 25 milliliters of a 37 percent formalin solution and the resultant solution heated under reflux for sixteen hours. The mixture was concentrated to a volume of 100 milliliters, diluted with three volumes of dry ether, cooled, and the product collected on a filter. Forty-eight grams of 3-methyl-3-phenyl-octahydropyrid[1,2-c]-oxazine hydrochloride was obtained, melting point 234–236° C. (dec.). An analytical sample melted at 239–240° C.

Thirty-five grams (0.13 mol) of 3-methyl-3-phenyl-octahydropyrid[1,2-c]-oxazine hydrochloride was dissolved in 25 milliliters concentrated hydrochloric acid and the solution heated under reflux for seventeen hours. The water was removed under vacuum and the residue crystallized from an ethyl acetate-isopropanol mixture to give 14 grams of crude product, melting point 207–219° C. Recrystallization from isopropanol gave nine grams of product, 2-phenyl-1,6,7,8,9,9a-hexahydro-4-quinolizine hydrochloride,[1] melting point 215–217° C.

*Analysis.*—Calculated for $C_{15}H_{19}N \cdot HCl$: C, 72.11; H, 8.07; N, 5.61. Found: C, 71.93; H, 8.25; N, 5.64.

Example II

Picolyl lithium was prepared from 252 grams (1.6 mol) of bromobenzene, 22 grams (3.2 mols) lithium wire, and 149 gram (1.6 mol) alpha-picoline in 800 milliliters of dry ether as in Example I. To this stirred suspension was added 210 grams (1.4 mol) p-methoxyacetophenone in 200 milliliters dry ether, keeping the temperature from −15 to −20° C. The resulting suspension was stirred under reflux for two hours, then decomposed with an aqueous solution of ammonium chloride. The ether layer was separated, the ether was removed under vacuum, and volatile materials were removed by distillation to a temperature of 120° C. at 1.0 mm. pressure. Upon cooling, the residue solidified to an oily solid, weight 209 grams, melting point about 50° C. The product was used in the next step without further purification. A small portion of it was recrystallized from a mixture of ether and 75–90° petroleum ether to give the pure product, alpha-methyl-alpha-(p-anisyl)-2-pyridineethanol, melting point 55–56° C. Two hundred and thirty grams (0.95 mol) of crude alpha-methyl-alpha-(p-anisyl)-2-pyridineethanol was dissolved in 1250 ml. ethanol containing 75 ml. glacial acetic acid and hydrogenated under fifty pounds $H_2$ pressure with $PtO_2$ catalyst. The theoretical amount of hydrogen was taken up in seven hours. The mixture was filtered, and the filtrate was concentrated under vacuum, leaving as an oil the crude acetate salt of alpha-methyl-alpha-(p-anisyl)2-piperidineethanol. This crude salt was dissolved in 200 ml. of ethanol and 100 ml. of 37 percent aqueous formalin solution was added. The solution was heated to reflux for eighteen hours. It was then concentrated to an oil, diluted with 300 ml. of a 1:1 mixture of isopropyl alcohol and ethyl acetate, a slight excess of alcoholic hydrochloric acid solution was added and the solution was chilled. The product was collected on a filter and dried. One hundred and six grams of product, the hydrochloride salt of 3-methyl-3-(p-anisyl)-octahydropyrid[1,2-c]oxazine, was obtained, melting point 208–210° (dec.). An analytical sample, after further recrystallizations melted at 212–214° C.

One hundred and three grams (0.35 mol) of the above-prepared oxazine was dissolved in 45 ml. of concentrated hydrochloric acid and the solution heated under reflux for eighteen hours. The water was removed under vacuum, and the residue was recrystallized from a mixture of isopropyl-alcohol and ethyl acetate to give 41.5 grams of crude product, melting point 180–200° C. Several recrystallizations gave the pure 2-(p-hydroxyphenyl)-1,6,7,8,9,9a-hexahydro-4-quinolizine hydrochloride, melting point 278–280° C.

[1] Patterson and Capell, The Ring Index, Reinhold Publishing Corporation, New York, 1940, page 149.

*Analysis.*—Calculated for $C_{15}H_{19}NO \cdot HCl$: C, 67.78; H, 7.59; N, 5.27. Found: C, 67.75; H, 7.78; N, 5.33.

When a lower alkyl acetophenone such as p-ethylacetophenone or a haloacetophenone such as p-chloroacetophenone is used in place of p-methoxyacetophenone, the resulting product has the phenyl group subsituted with a lower alkyl or halo radical instead of the hydroxy radical as in the above.

Example III

To a stirred suspension of 12 grams (0.045 mol) of 2-(p-hydroxyphenyl)-1,6,7,8,9,9a-hexahydro-4-quinolizine and 5.4 grams (0.1 mol) sodium methoxide in 200 ml. of dry tetrahydrofuran was added dropwise a solution of 7.5 grams (0.055 mol) of beta-diethylaminoethyl chloride in 20 ml. of toluene. The reaction mixture was heated under reflux for twenty-four hours, then filtered to remove the insoluble material. The filtrate was evaporated under vacuum, and the residue was dissolved in ether, and the calculated amount of alcoholic hydrochloric acid solution was added. The precipitated product was collected and recrystallized from a mixture of ethyl acetate and chloroform giving seven grams of 2-[p-(betadiethylamino-ethoxy)phenyl]-1,6,7,8,9,9a-hexahydro-4-quinolizine dihydrochloride, melting point 195–196° C.

2-[p-(ethoxy)phenyl]-1,6,7,8,9,9a-hexahydro-4-quinolizine and other lower alkoxyl phenyl substituted compounds may be similarly prepared using, however, ethyl bromide or iodide or other lower alkyl halides in place of beta-diethylaminoethyl chloride in the above reaction.

This application is a continuation-in-part of application Serial No. 723,112, filed March 24, 1958, and now abandoned.

I claim:
1. A compound of the formula:

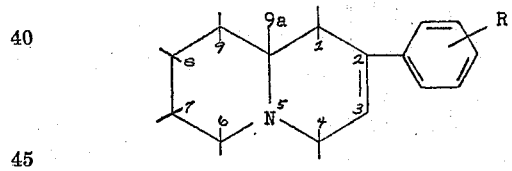

in which R is a member of the group consisting of hydrogen, lower alkyl, hydroxy, lower alkoxy, halogen, and dialkylaminoalkoxy.
2. 2-phenyl hexahydro quinolizine.
3. 2-(p-hydroxy phenyl)-hexahydro quinolizine.
4. 2-[p-(β-diethylaminoethoxy)phenyl]-hexahydro quinolizine.

References Cited in the file of this patent

Winterfeld et al.: Chemical Abstracts, vol. 51, page 1168 (1957).

Murakoshi: Chemical Abstracts, vol. 52, page 18409e (1958).